United States Patent
Bottine et al.

(10) Patent No.: US 10,674,340 B2
(45) Date of Patent: Jun. 2, 2020

(54) SYSTEM AND METHOD FOR COMMUNICATING SPATIALLY ORGANIZED INFORMATION

(71) Applicant: SES-imagotag, Incorporated, Nanterre (FR)

(72) Inventors: Philippe Bottine, Boulogne-Billancourt (FR); François Robin, Paris (FR)

(73) Assignee: SES-imagotag, Incorporated (FR)

( * ) Notice: Subject to any disclaimer, the term of this patent is extended or adjusted under 35 U.S.C. 154(b) by 0 days.

(21) Appl. No.: 16/281,190

(22) Filed: Feb. 21, 2019

(65) Prior Publication Data

US 2019/0253855 A1 Aug. 15, 2019

Related U.S. Application Data

(63) Continuation of application No. 13/861,314, filed on Apr. 11, 2013, now abandoned, which is a (Continued)

(51) Int. Cl.
*H04W 4/80* (2018.01)
*H04W 4/029* (2018.01)
(Continued)

(52) U.S. Cl.
CPC .......... *H04W 4/80* (2018.02); *G06F 16/9537* (2019.01); *G06Q 30/0267* (2013.01); (Continued)

(58) Field of Classification Search
CPC .................................. H04W 4/80; H04W 4/35
See application file for complete search history.

(56) References Cited

U.S. PATENT DOCUMENTS

| | | | |
|---|---|---|---|
| 7,152,040 B1 | 12/2006 | Hawthorne et al. | |
| 8,049,621 B1 * | 11/2011 | Egan | G06Q 10/087 235/375 |
| 8,228,196 B1 * | 7/2012 | Thornton | G06Q 30/0268 235/378 |
| 2002/0004387 A1 | 1/2002 | Newville | |
| 2004/0010446 A1 | 1/2004 | Vanska et al. | |
| 2005/0021561 A1 | 1/2005 | Noonan | |
| 2005/0097038 A1 | 5/2005 | Yu et al. | |

(Continued)

FOREIGN PATENT DOCUMENTS

| | | |
|---|---|---|
| EP | 2431954 A1 | 3/2012 |
| JP | 200611617 A | 1/2006 |

(Continued)

*Primary Examiner* — Tuan H Nguyen
(74) *Attorney, Agent, or Firm* — Lerner, David, Littenberg, Krumholz & Mentlik, LLP

(57) ABSTRACT

A method for communicating data representing spatially organized information, performed by a central server RF-frequency peripherals with locations within a predetermined area, each location being defined by a vertical and horizontal position within a plane perpendicular to a floor of the predetermined area, each location being associated with a corresponding unique identifier. The method may involve receiving a communication from a mobile terminal including a unique identifier received by the mobile terminal from an RF peripheral located in the predetermined area, determining a location of the mobile terminal within the predetermined area based on the location associated with the unique identifier, and transmitting to the mobile terminal spatially localized information associated with the location. The unique identifier may be particular to an RF peripheral including an antenna and an electronic chip configured for NFC to be activated by the mobile terminal when the peripheral is within a communication range.

9 Claims, 3 Drawing Sheets

Related U.S. Application Data continuation of application No. PCT/FR2012/050791, filed on Apr. 11, 2012.

(51) Int. Cl.
  *G06Q 30/06* (2012.01)
  *G06F 16/9537* (2019.01)
  *G06Q 30/02* (2012.01)
  *H04W 4/35* (2018.01)
  *H04W 4/18* (2009.01)

(52) U.S. Cl.
  CPC ............ *G06Q 30/06* (2013.01); *H04W 4/029* (2018.02); *H04W 4/185* (2013.01); *H04W 4/35* (2018.02)

(56) References Cited

U.S. PATENT DOCUMENTS

| | | |
|---|---|---|
| 2009/0303018 A1 | 12/2009 | Catteau |
| 2012/0055985 A1 | 3/2012 | Allen |
| 2012/0197729 A1 | 8/2012 | Bertram et al. |
| 2013/0048721 A1* | 2/2013 | Rasband ............ G06Q 30/0241 235/383 |
| 2013/0048731 A1 | 2/2013 | Flickner et al. |

FOREIGN PATENT DOCUMENTS

| | | |
|---|---|---|
| JP | 200877131 A | 4/2008 |
| JP | 2011154614 A | 8/2011 |
| JP | 2011191822 A | 9/2011 |
| JP | 201238270 A | 2/2012 |
| WO | 2010131629 A1 | 11/2010 |

* cited by examiner

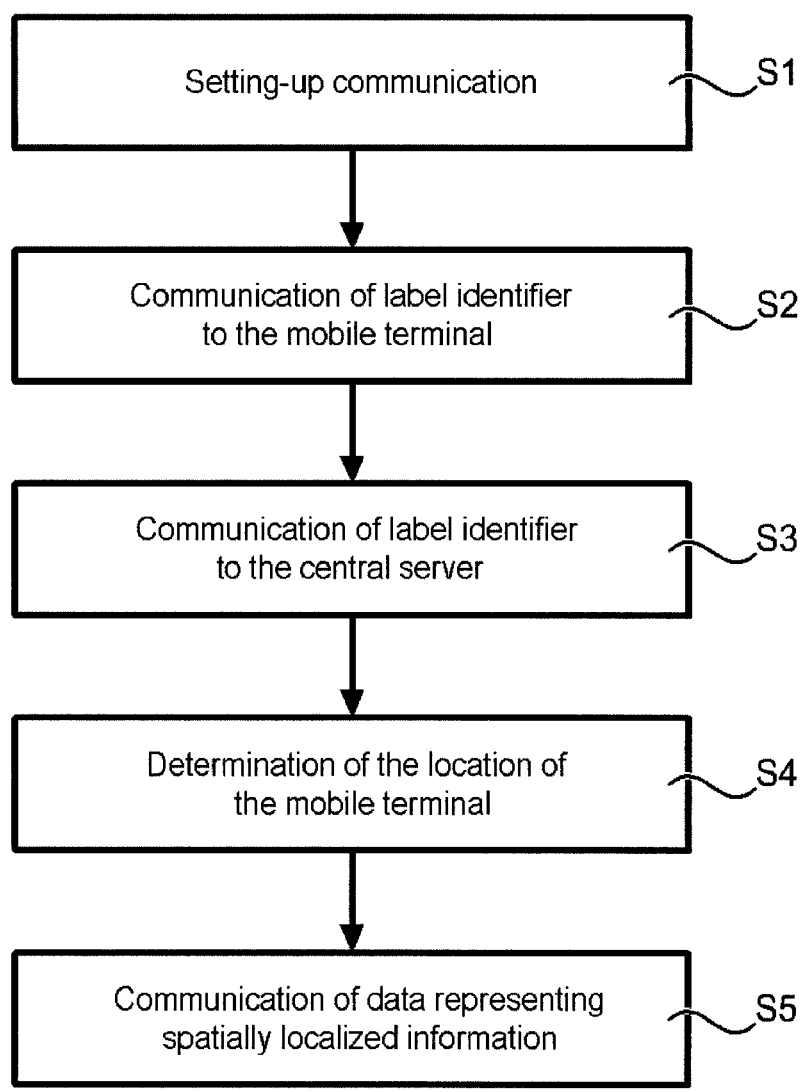

SYSTEM AND METHOD FOR COMMUNICATING SPATIALLY ORGANIZED INFORMATION

CROSS-REFERENCE TO RELATED APPLICATIONS

The present application is a continuation of U.S. patent application Ser. No. 13/861,314, filed Apr. 11, 2013, now abandoned, which claims priority from International Application No. PCT/FR2012/050791 filed Apr. 11, 2012, all of which are incorporated herein by reference.

GENERAL TECHNICAL FIELD AND BACKGROUND OF THE INVENTION

The present invention generally concerns the display of information in a sales area.

The display of information relating to items offered for sale in a sales area is generally obtained using labels which, in particular, display the price of the item with which a label is associated and other information such as price per weight, etc.

The need to provide a display of updated information has warranted the installing in numerous sales areas of electronic labels having a screen on which the display of information is remote controlled.

The usefulness of such systems for display shelving at sites such as supermarkets, hypermarkets or any other sales area, is essentially to allow consumers to be presented with a price for each item on sale, this price reliably corresponding to the price such as indicated in the central file of the site, i.e., to the price such as will effectively be charged at the check-out.

Another advantage of these known systems is to allow automated price changes to be made within much shorter time periods than with manual display, whether for special offer periods at the site for all or some of the items on sale, to reflect price changes, to face inflationary situations during which very frequent prices increases must be made, etc.

Also, in matters of price displays, there are numerous constraints in particular legal constraints regarding the type of displayed prices (unit price, special offer price, etc.), which must be heeded by electronic systems in the same manner as for paper displays.

Therefore electronic label systems, although they are tending to become increasingly more sophisticated over time, nonetheless remain relatively rigid regarding the different display possibilities, and regarding the time and spatial organization of these different possibilities.

In addition, these electronic labels only allow the display of information relating to the item with which each one is associated, and moreover this information is generally restricted to the price displayed by the labels.

Additionally, consumers are currently left to fend for themselves in a sales area providing information relating solely to the items on sale. Consumers must browse through this information to find relevant data. In a sales area generally having several thousand items on offer, finding the suitable item may prove to be most complicated.

Furthermore with the emergence of electronic trade, consumers have become accustomed to information specifically given for their intention. Yet the display of information such as currently found in sales areas does not offer any interaction with consumers.

There are currently no means of disseminating information specifically intended for a consumer and related to the consumer's position in a store, or even related to a product specific to this consumer.

DESCRIPTION OF THE INVENTION

The present invention therefore sets out to propose means for providing consumers with spatially localized information, in relation to the place and context of a consumer, which complements the information already visually available in a sales area. A further objective is to be able to provide consumers at the point of sale with information that is specifically intended and personalized for this consumer.

For this purpose, according to a first aspect a method is proposed for communicating data, representing spatially localized information, to a mobile terminal in relation to the location of said mobile terminal in a sales area equipped with a distributed series of electronic labels, each electronic label being identified by a single label identifier, said method comprising the steps in which:
  a mobile terminal sets up a communication via radio-frequency with a radio-frequency peripheral of an electronic label;
  the radio-frequency peripheral of said electronic label communicates to said mobile terminal a label identifier of said electronic label;
  the mobile terminal communicates said label identifier to a central server;
  the central server determines the location of said mobile terminal from the label identifier of said electronic label;
  the central server communicates data to the mobile terminal representing spatially localized information associated with the location of said mobile terminal.

According to the first aspect, the invention is advantageously but optionally complemented by the following characteristics taken alone or in any technical possible combination thereof:
  the radio-frequency peripheral of the electronic label has a communication range of less than 20 cm;
  the setting-up of the communication between the mobile terminal and the radio-frequency peripheral comprises the steps in which:
    a user brings the mobile terminal close to the radio-frequency peripheral of the electronic label, so that the radio-frequency peripheral is within the range of the electromagnetic waves emitted by the mobile terminal;
    said radio-frequency peripheral is activated by the energy of the electromagnetic waves emitted by the mobile terminal in order to set up communication via radio-frequency between the radio-frequency peripheral of the electronic label and the mobile terminal;
  the central server determines the location of said mobile terminal from the identifier of said electronic label by means of data from a planogram associating a location with the label identifier;
  the communication between the central server and the mobile terminal is set up via the internet;
  the data representing spatially localized information associated with the location of said mobile terminal take into account data specific to the user of the mobile terminal previously stored in a database accessible via a communication network.

According to a second aspect, a communication system is also proposed to communicate localized data within a sales area, comprising:
- a mobile terminal capable of communicating with a central server;
- a series of electronic labels distributed throughout the sales area, each electronic label being identified by a unique label identifier, in which an electronic label of said series of electronic labels also comprises a radio-frequency peripheral with which the mobile terminal is able to set up a communication to acquire the label identifier of said label, and the system is configured to implement the method according to the first aspect.

The invention according to the second aspect is advantageously but optionally complemented by the following characteristics taken alone or in any possible technical combination thereof:
- said electronic label also comprises
- a radio-frequency communication module to receive data representing item-related information originating from a central server;
- a memory to store said data;
- a microcontroller to control the display of information relating to an item;
- a display screen to display said item-related information;
- the radio-frequency peripheral of the electronic label comprises an antenna and an electronic chip of NFC or RFID type;
- the chip and the antenna are arranged at different points of the electronic label, connections ensuring the link between the antenna and the chip;
- the chip is connected to a microcontroller of the electronic label, and the antenna is arranged on or in a case inside which said microcontroller is housed;
- the mobile terminal is adapted to transmit data to the electronic label via the radio-frequency peripheral of said electronic label.

PRESENTATION OF THE FIGURES

Other characteristics, objectives and advantages of the invention will become apparent from the following description which is solely illustrative and non-limiting, and is to be read with reference to the appended drawings in which:

FIG. 4 is a schematic illustrating the implementing of the method according to the first aspect of the invention.

DETAILED DESCRIPTION

Figure 1:
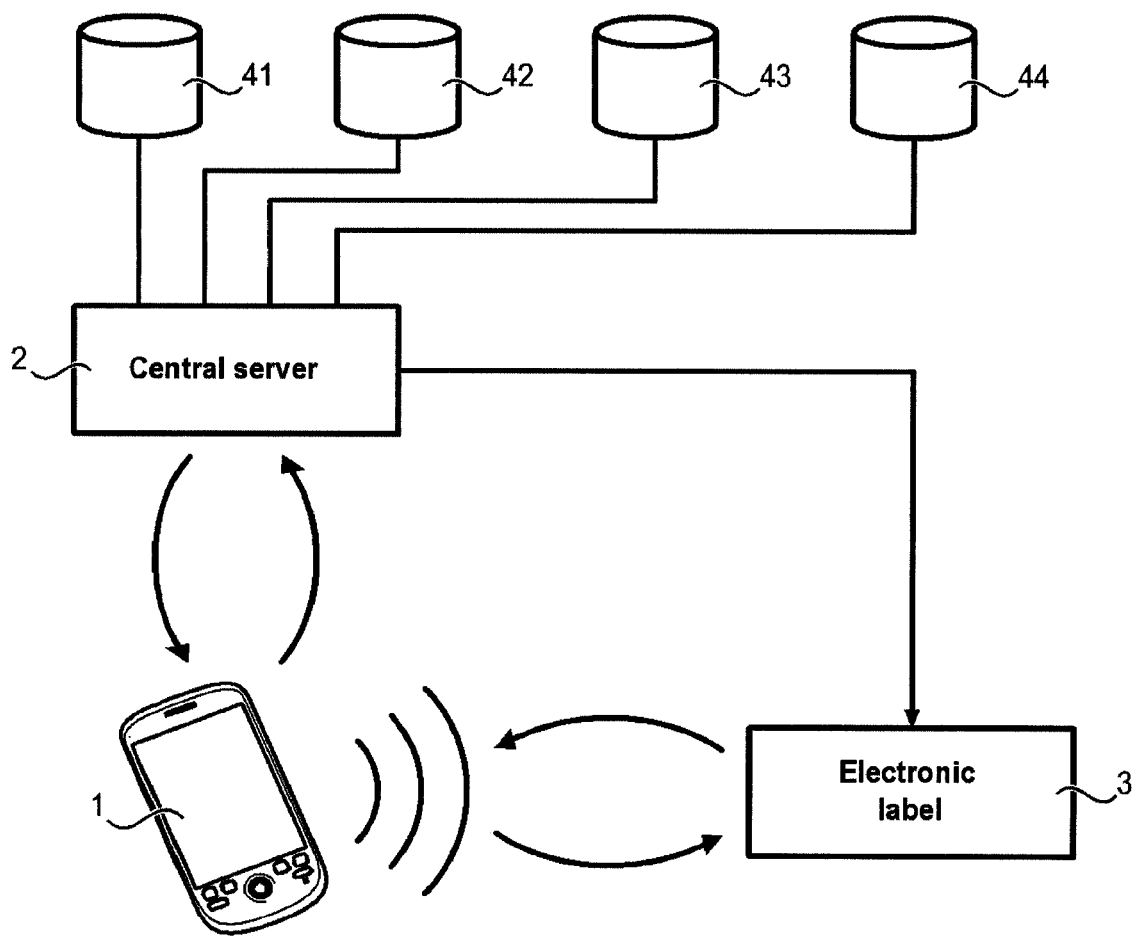
FIG. 1 is a schematic illustrating the system according to one possible embodiment of the second aspect of the invention.

FIG. 1 is an illustrative but non-limiting depiction of a communication system to communicate data representing spatially localized information in a sales area, corresponding to one possible embodiment of the invention.

The illustrated system comprises a mobile terminal 1 capable of communicating with a central server 2. This mobile terminal 1 is preferably provided with data display means, such as a screen, intended for a user of said mobile terminal 1.

Communication between the mobile terminal 1 and the central server 2 can be set up via any, at least partly wireless, communication network in particular via a wireless network of WIFI or 3G type. Communication can therefore be set up through the Internet link to which the central server 2 is connected.

To facilitate this communication, the sales area may be provided with WIFI terminals setting up a connection between the mobile terminal 1 and the internet network to which the central server 2 is connected.

A common example of said mobile terminal 1 is a mobile telephone of smartphone type, which offers suitable connection and data processing possibilities. In addition, the generalization of this type of telephone enables a large number of consumers to use their own mobile terminal 1. Other mobile terminals can be used provided they meet the requirements of communicability with the central server and the capability to display information to the user thereof. For example, a tablet computer can be used as mobile terminall.

The system also comprises a series of electronic labels distributed throughout the sales area. The labels have strong spatial density, typically about ten labels/$m^2$ on average, this varying to a large extent.

Each electronic label 3 is identified by a unique label identifier particular to it. This label identifier therefore allows unambiguous identification of a single unique label within the sales area.

Figure 2:
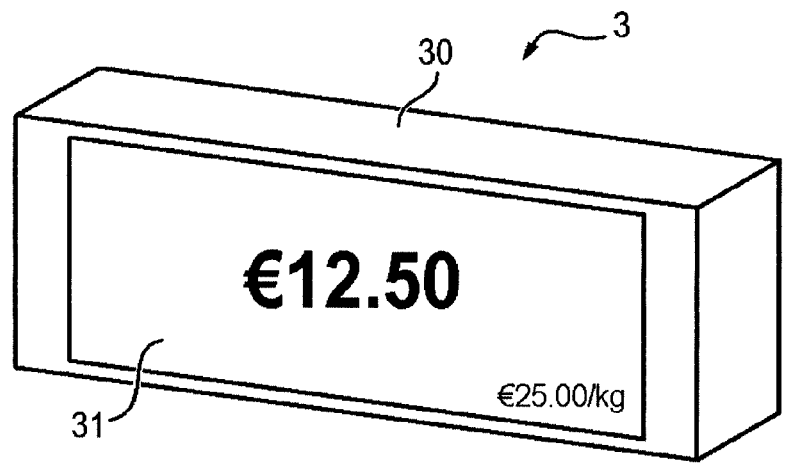
FIG. 2 is a schematic illustrating a front view of an electronic label of a system according to one possible embodiment of the second aspect of the invention.
Figure 3:
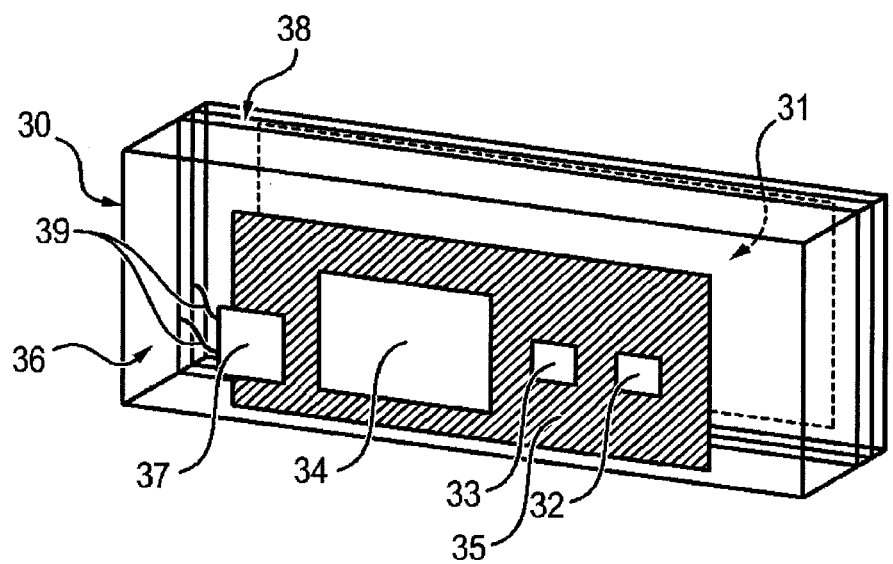
FIG. 3 is a rear transparency view of an electronic label of a system according to one possible embodiment of the second aspect of the invention.

FIGS. 2 and 3 illustrate an example of an electronic label 2 according to the invention. Said electronic label comprises a display screen 31 to display information relating to an item with which it is associated. Typically, and as illustrated in FIG. 2, this information comprises the price of the item, and other information usually available in a sales area, e.g., the price per kilogram of a food product. The electronic label also comprises a case 30 in plastic inside which the functional constituents of the electronic label 3 are housed.

In particular, the electronic label 3 comprises a radio-frequency communication module 32 to receive data representing information relating to an item and derived from a central station, a memory 33 to store said data and a microcontroller 34 to control the display of information relating to the item. These different functional constituents are arranged on a printed circuit board 35 housed in the case 30.

The electronic label 3 of said series of electronic labels also comprises a radio-frequency peripheral 36 with which the mobile terminal 1 is able to set up a communication to acquire the label identifier of said electronic label 3.

The radio-frequency peripheral 36 of the electronic label 3 comprises an antenna 38 and an electronic chip 37 of NFC type (Near Field Communication) or RFID type (Radio-Frequency Identification).

A radio-frequency peripheral of NFC type operates at a frequency of 13.56 Mhz similar to a radio-frequency peripheral of RFID HF type.

A radio-frequency peripheral of NFC type corresponds to the ISO 14443 protocol, which is highly secure with encrypting. NFC communication is tending to be become widespread in personal mobile terminals such as mobile telephones and therefore offers the advantage of massive deployment.

The application thereof to electronic labels 3 does not require a high level of security which means that a radio-frequency peripheral of RFID HF type (ISO 15693 protocol) is fully adapted to this use and its low cost makes it attractive.

Mobile terminals equipped with NFC did not initially support the ISO 14443 protocol but recent appliances are mostly bi-modal and future developments are expected to evolve towards bi-modality.

Preferably, the chip 37 and the antenna 38 are arranged at different points of the electronic label 3, interconnects 39 ensuring the link between the antenna 38 and the chip 37.

More preferably, the chip 37 is connected to the microcontroller 34 of the electronic label 3 and the antenna 38 is arranged on or in the case 30 inside which said microcontroller 34 is housed. Further preferably, the antenna 38 is arranged on the front face side of the electronic label 3, towards the display screen 31, whilst the electronic chip 37 is arranged on the printed circuit board 35 on the back face side of the electronic label 3.

The integration of a radio-frequency peripheral 36 grouping together a chip and antenna on one same carrier is not desirable on the front face of the electronic label 3 since it is detrimental to maximization of the display area of the display screen 31, in particular to allow dense arranging of electronic labels 3 on aisle displays especially for items of small size.

In addition, the connections between the electronic chip 37 and the microcontroller 34 may be complex and difficult to obtain industrially at low cost. The chip 37 is therefore preferably implanted on the printed circuit board thereby facilitating the connection thereof to the microcontroller 34.

However, the positioning of the antenna inside on the back face next to the chip 37 would reduce distance and reading reliability since reading would then have to take place through the display screen 31 of the electronic label 3 (typically having a thickness of 1 cm) and the electromagnetic disturbance caused by the printed circuit board.

It is therefore preferable to separate the antenna 38 from the chip 37. The chip 37 is then preferably implanted on the printed circuit board, thereby facilitating the connection thereof to the microcontroller 34.

The antenna 38 is therefore preferably integrated in the plastic case 30 towards the front part thereof, preferably around the part reserved for the display screen 31 and over-molded during injection at the time of manufacture of the case 30. The size of the antenna 38 can be maximized thereby allowing the communication distance to be increased.

However, in all cases, this communication distance with the radiofrequency peripheral 36 must be chosen to be relatively short, less than 20 cm, and further preferably less than 10 cm from the antenna 38.

Preferably, the mobile terminal 1 is adapted to transmit data to the electronic label 3 via the radio-frequency peripheral 36 of said electronic label 3. The display of the electronic label 3 can then be updated by the mobile terminal 1.

The system for communication data representing spatially localized information within a sales area is configured to implement the method according to the first aspect of the invention, of which one possible embodiment will be described.

The method allows the communication of data, representing spatially localized information, to the mobile terminal 1 in relation to the location of said mobile terminal 1 within a sales area equipped with a distributed series of electronic labels 3, each electronic label 3 being identified by a unique label identifier particular to it.

At first, the mobile terminal 1 sets up a communication via radio-frequency with a radio-frequency peripheral 36 of an electronic label 3 (Step 51).

To do so, a user brings the mobile terminal 1 close to the radio-frequency peripheral 36 of the electronic label 3, so that the radio-frequency peripheral 36 comes within the range of the electromagnetic waves emitted by the mobile terminal 1.

The radio-frequency peripheral 36 is then activated by the energy of the electromagnetic waves emitted by the mobile terminal 1 to set up communication via radio-frequency with the radio-frequency peripheral 36 of the electronic label 3.

The radio-frequency peripheral 36 of said electronic label 3 then communicates to said mobile terminal 1 a label identifier of said electronic label 3 (Step 52). This label identifier can be communicated alone or accompanied by other information or else as part of communicated data which are at least partly generated from said identifier and which allow identification of the electronic label 3 in the sales area.

The mobile terminal mobile 1 communicates said label identifier to a central server 2 (Step 53). Similarly, the communicated data must allow identification of the electronic label 3 in the sales area and need not necessarily assume the form of solely the label identifier. Therefore, the data exchanged between the mobile terminal 1 and the central server 2 may be the same or else different from the data exchanged between the electronic label 3 and the mobile terminal 1; the only requirement being the possibility of identifying the electronic label 3 in the sales area.

The central server 2 determines the location of said mobile terminal 1 from the label identifier of said electronic label 3 (Step 54). The central server 2 determines the location of said mobile terminal 1 from the identifier of said electronic label 3 using the data of a planogram associating a location with the label identifier. A planogram lists the locations of all the electronic labels 3 and of the items on sale in a sales area.

Up to 10% of items in a sales area can be present at several separate points and hence sole knowledge of the item, e.g., through an item identifier such as a barcode or Electronic Product Code (EPC) does not allow the determining of the precise location of the mobile terminal 1.

On the other hand, the uniqueness of the label identifier and of the location associated with each electronic label 3 allows unambiguous determination of the location of the electronic label 3 from its identifier, and as a result it is possible to determine the location of the mobile terminal 1.

The mobile terminal 1 is effectively positioned in the immediate vicinity of the electronic label 3 from which it has acquired the identifier, so that the locating of the label allows determination of the location of the mobile terminal 1.

The communication range of the radio-frequency peripheral 36 is preferably less than 20 cm, more preferably less than 10 cm, and is even 5 cm. A relatively short range firstly ensures matching between the location of the electronic label 3 and the mobile terminal 1 and secondly allows interference to be limited between electronic labels when they are positioned close to one another.

In addition, a short range requires deliberate action by the user of the mobile terminal 1 to set up communication between the mobile terminal 1 and the electronic label 3. The user then has no reason to fear for the protection of private life and since the system proves to be little intrusive it cannot easily be diverted from its primary vocation set forth in this description.

Once the locating of the mobile terminal 1 has been determined, the central server 2 communicates data to the mobile terminal 1 which represent spatially localized information associated with the location of said mobile terminal 1 (Step 55).

This data representing spatially localized information associated with the location of said mobile terminal 1 may take into account data specific to the user of the mobile terminal 1, previously stored in a database 41, 44 accessible via a communication network.

For example, one database 41 may comprise a shopping list previously defined by the user, and the database 44 may comprise health data entered by the user by means of which information on items can be matched with personal information, for example medical contra-indications such as the presence of allergens specified by the user.

Other databases 42, 43 can be used and may in particular comprise the planogram, information relating to items, relating to the sales area, etc.

Therefore the electronic label can be used as background sensor since it allows the context of the mobile terminal to be determined with which it is in communication.

It is hence possible to make provision for example for a web application to deliver data to the mobile terminal concerning the item in whose vicinity the mobile terminal—and therefore the user thereof—is positioned, in particular technical datasheets, cooking recipes, suggestions of substitution products or related special offers.

The user may also benefit from a web application taking into account the items whose associated label identifiers have been acquired by the mobile terminal 1, for example to display the total price of said items during a shopping session.

It is also possible to provide a web application capable of updating a shopping list, as and when the label identifiers are acquired associated with items on this shopping list. Knowing the location of the mobile terminal 1, it is then possible to indicate to the user the direction of an item on the shopping list and thereby plan the circuit to be followed by the user within the sales area.

More generally, knowledge of the location of the mobile terminal 1, and hence of the user thereof, allows said mobile terminal 1 to be provided with spatially localized information such as the path to be followed to reach a specific item.

The ability to locate via electronic labels 3 allows finegranularity to an extent never reached in locating systems of GPS type. Each meter of aisle shelving for product display having several labels 3 at different heights, it is even possible to locate the height of the mobile terminal 1.

For example, a user when searching for a particular item, places his/her mobile terminal 1 close to an electronic label 3. The implementing of the method according to the invention allows information to be communicated to the mobile terminal 1 relating to the place of the sought-after item, in relation to the mobile terminal 1. For example, an arrow in a top/right diagonal direction with an indication of the distance, e.g., 50 cm, indicates that the item desired by the user is to the top right of the current position of the mobile terminal 1 at a distance of 50 cm therefrom.

It is also possible to carry out secure payment using the mobile terminal 1 by reading the identifiers of the electronic labels corresponding to the items the user wishes to purchase. All that is required is communication with a payment system when the user leaves the sales area.

The invention also enables users to be offered a sales area having optimized configuration. The manager of the sales area may have knowledge of the specific movements and behavior of users of mobile terminals 1 and can therefore determine an optimized configuration of the sales area as a function of such data.

According to one optional embodiment, the display of the electronic label 3 can be modified during communication with the mobile terminal 1. For example, provision can be made for more illuminated display or for display of particular data if a radio-frequency peripheral 36 communicates with a mobile terminal 1.

Preferably, the mobile terminal is adapted to transmit data to the electronic label 3 via the radio-frequency peripheral 36 of said electronic label 3, in particular to update data and optionally the position of the electronic label when a mobile terminal 1 is used by an employee of the sales area.

The invention claimed is:

1. A method for communicating spatially localized information to a mobile terminal, the method being performed by a central server configured to access a planogram associating a plurality of unique identifiers of radio-frequency peripherals with a plurality of locations within a predetermined area, each of the plurality of locations being defined by a vertical and horizontal position within a plane perpendicular to a floor of the predetermined area, and each of the plurality of locations being associated one-to-one with a corresponding unique identifier, the method comprising:
   receiving a communication from a mobile terminal, the communication comprising a unique identifier received by the mobile terminal from a radio-frequency peripheral located in the predetermined area, the unique identifier being particular to the radio-frequency peripheral, wherein the radio-frequency peripheral includes an antenna and an electronic chip configured for near-field communication, and is configured to be activated by the mobile terminal when the radio-frequency communication peripheral is within a communication range of the mobile terminal, wherein the communication range is less than twenty centimeters;
   determining a location of the mobile terminal within the predetermined area based on the location associated with the unique identifier of the received communication in the planogram, the location of the mobile terminal comprising the vertical and horizontal position of said location; and
   transmitting to the mobile terminal spatially localized information associated with the location of the mobile terminal.

2. The method according to claim 1, further comprising:
   when the mobile terminal is positioned relative to the radio-frequency communication peripheral within the communication range, energy of electromagnetic waves emitted by the mobile terminal activating the radio-frequency communication peripheral, thereby setting-up a radio-frequency communication between the mobile terminal and the radio-frequency peripheral, wherein the communication range is a range of the electromagnetic waves emitted by the mobile terminal.

3. The method according to claim 1, wherein the central server receiving the communication from the mobile terminal is via the Internet.

4. The method according to claim 1, wherein the spatially localized information is further associated with account data specific to the user of the mobile terminal previously stored in a database accessible to the central server via a communication network.

5. A system for communicating spatially localized information to a mobile terminal, the system comprising:
- a central server configured to access a planogram associating a plurality of unique identifiers of radio-frequency peripherals with a plurality of locations within a predetermined area, each of the plurality of locations being defined by a vertical and horizontal position within a vertical plane of the predetermined area, and each of the plurality of locations being associated one-to-one with a corresponding unique identifier;
- a mobile terminal configured to communicate with the central server; and
- a plurality of radio-frequency peripherals distributed throughout the predetermined area, wherein each radio-frequency peripheral includes an antenna and an electronic chip configured for near-field communication, and is configured to be activated by the mobile terminal when the radio-frequency communication peripheral is within a communication range of the mobile terminal, wherein the communication range is less than twenty centimeters,
- wherein the central server is configured to:
  - receive a communication from a mobile terminal, the communication comprising a unique identifier received by the mobile terminal from a radio-frequency peripheral located in the predetermined area, the unique identifier being particular to the radio-frequency peripheral;
  - determine a location of the mobile terminal within the predetermined area based on the location associated with the unique identifier of the received communication in the planogram, the location of the mobile terminal comprising the vertical and horizontal position of said location; and
  - transmit to the mobile terminal spatially localized information associated with the location of the mobile terminal.

6. The system according to claim 5, wherein at least one radio-frequency peripheral is an electronic label which comprises:
- a radio-frequency communication module configured to receive data representing information relating to an item from a central server;
- a memory to store said data;
- a microcontroller to control the display of information relating to an item;
- a display screen to display said item-related information.

7. The system according to claim 6, wherein the mobile terminal is adapted to transmit data to the electronic label via the radio-frequency communication module of said electronic label.

8. The system according to claim 5, wherein the chip and the antenna are arranged at different points of the radio-frequency peripheral, and wherein the radio-frequency peripheral comprises connections configured to ensure a communications link between the antenna and the chip.

9. The system according to claim 8, wherein the chip is connected to a microcontroller of the radio-frequency peripheral, and wherein the antenna is arranged on or within a case inside which the microcontroller is housed.

* * * * *

(12) INTER PARTES REVIEW CERTIFICATE (4008th)
United States Patent
Bottine et al.

(10) Number: US 10,674,340 K1
(45) Certificate Issued: Jul. 9, 2025

(54) SYSTEM AND METHOD FOR COMMUNICATING SPATIALLY ORGANIZED INFORMATION

(71) Applicants: Philippe Bottine; François Robin

(72) Inventors: Philippe Bottine; François Robin

(73) Assignee: VUSIONGROUP

Trial Number:

IPR2024-00189 filed Nov. 14, 2023

Inter Partes Review Certificate for:

Patent No.: 10,674,340
Issued: Jun. 2, 2020
Appl. No.: 16/281,190
Filed: Feb. 21, 2019

The results of IPR2024-00189 are reflected in this inter partes review certificate under 35 U.S.C. 318(b).

INTER PARTES REVIEW CERTIFICATE
U.S. Patent 10,674,340 K1
Trial No. IPR2024-00189
Certificate Issued Jul. 9, 2025

AS A RESULT OF THE INTER PARTES REVIEW PROCEEDING, IT HAS BEEN DETERMINED THAT:

Claims 1-9 are found patentable.

\* \* \* \* \*